United States Patent [19]

McKenna

[11] Patent Number: 5,787,452
[45] Date of Patent: Jul. 28, 1998

[54] CLIENT/SERVER DATABASE SYSTEM WITH METHODS FOR MULTI-THREADED DATA PROCESSING IN A HETEROGENEOUS LANGUAGE ENVIRONMENT

[75] Inventor: Michael G. McKenna, Oakland, Calif.

[73] Assignee: Sybase, Inc., Emeryville, Calif.

[21] Appl. No.: 651,100

[22] Filed: May 21, 1996

[51] Int. Cl.$^6$ .................................................. G06F 17/21
[52] U.S. Cl. ........................................ 707/536; 704/8
[58] Field of Search ................................ 707/536, 100, 707/104, 523; 704/8, 2; 395/682

[56] References Cited

U.S. PATENT DOCUMENTS

| | | | |
|---|---|---|---|
| 5,157,606 | 10/1992 | Nagashima | 704/2 |
| 5,231,581 | 7/1993 | Garneau et al. | 704/8 |
| 5,307,265 | 4/1994 | Winans | 704/8 |
| 5,418,718 | 5/1995 | Lim et al. | 707/536 |
| 5,499,335 | 3/1996 | Silver et al. | 704/8 |
| 5,649,214 | 7/1997 | Bruso et al. | 704/8 |

OTHER PUBLICATIONS

Bauwens et al, "Standardization as a Prerequisite for Accessibility of Electronic Text Information . . . ", IEEE Transactions on Rehabilitation Engineering, v3 n1, pp. 84–89, Mar. 1995.

Kapustein, "Writing DLL functions for VB4", Windows Developer's Journal, v7 n6 p. 43(6), Jun. 1996.
Davis et al, "Unicode", Systems, Man, and Cybernetics, 1990 International Conference, IEEE, pp. 499–504, 1990.
Hall, W., "*Adapt Your Program for Worldwide Use with Windows Internationalization Support*," Microsoft Systems Journal, Nov./Dec. 1991, pp. 29–58.
Van Camp, D., "*Unicode and Software Globalization*," Dr. Dobb's Journal, Mar. 1994, pp. 46, 48–50.

Primary Examiner—Joseph H. Feild
Attorney, Agent, or Firm—John A. Smart

[57] ABSTRACT

A system providing improved National Language Support (NLS) in application programs is described. The system employs normalized Unicode data with generic transformation structures having locale overlays. Methods are described for navigating the structures during system operation, for effecting various transformation processes using locale-specific information. The locale-specific information is maintained in the structures as external data files. Since the data files are read in at runtime, the underlying binary files which comprise the program need not be modified for updating the program to support a new locale. The approach provides extensibility to applications with National Language Support. Additionally, increased portability is provided, since manipulation of the underlying data remains unchanged regardless of the underlying platform. Program maintenance is also decreased, since engineers need only maintain a single core.

10 Claims, 12 Drawing Sheets

TRANSFORM HEAP

USE FOR FINAL VALUES GREATER THAN 3 BYTES IN LENGTH
E.G.

- UPPER CASE OF β TO SS
- CHARACTER DECOMPOSITION OF É TO E´

TRIE - USING TRANSFORM HEAP

CLIENT/SERVER DATABASE SYSTEM WITH METHODS FOR MULTI-THREADED DATA PROCESSING IN A HETEROGENEOUS LANGUAGE ENVIRONMENT

The present application is related to co-pending application Ser. No. 08/646,782, filed May 21, 1996, and now pending.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates in general to the field of data processing and, more particularly, to the processing of culturally-sensitive information.

For software publishers, overseas markets comprise an ever-growing percentage of revenues for all major PC applications. Traditionally, however, software products have been designed with little or no thought toward portability, let alone translating software products for overseas markets. As non-English speaking countries are buying more and more software from U.S. publishers, there is keen interest in improving the process of enabling or "internationalization," that is, designing and coding a software product so that it can be made to function for international use.

In the past, the process of providing National Language Support (i.e., accommodating a specific country's language, conventions, and culture) was done on a more or less ad hoc basis—essentially retrofitting software to accommodate a particular locale. Merely separating the text in a user interface from one's program is not an acceptable solution, however. Even after translating software prompts, help messages, and other textual information to the target language, one still has to address basic issues of displaying and printing characters in the target language.

For instance, a target language will often include characters which are not defined by the default character set provided by the computer's operating system. IBM-compatible PCs running MS-DOS, for example, can display and print up to 256 different characters, the first 128 characters of which include the well-known 7-bit ASCII character set. This, of course, is not enough characters to support all languages. Some languages will obviously require a different character set; thus, sufficient means must be provided for switching character sets.

Other issues to consider when developing a system for foreign users include various format conventions applicable for a particular country. Any use of currency, date, time, and the like within one's software must take into account these factors. For example, systems sold for European languages must accomodate additional characters, such as letters with diacritics, and symbols, such as the British pound (£) sign.

Modern-day operating systems, such as Microsoft Windows NT, support international sorting strings using language-independent tables. For an introduction of Microsoft Windows' internationalization support, see e.g., Hall, W., *Adapt Your Program for Worldwide Use with Windows Internationalization Support*, Microsoft Systems Journal, Vol 6, No. 6, Nov/Dec 1991, pp. 29–45, the disclosure of which is incorporated by reference herein.

Today, there exists great interest in providing portable multi-threaded locales for data processing. Specifically, this entails a data processing environment that is multi-threaded—multiple processes operating simultaneously for handling multiple users at the same time. Such environments typically comprise a database server (e.g., Sybase SQL Server), a programmatic open server (e.g., Sybase Open Server), a terminal server, or the like. Generally, such an environment includes some type of server application operating in a client/server environment.

A problem exists outside of English environments, however. In particular, situations arise where different users of a system may be speaking different languages (i.e., employing different locale-specific character sets, collation sequences, and/or data attributes). Here, "locale" refers to a total-user environment set up for the system to determine which language to use for messages, what formatting to use for various cultural strings (e.g., date, time, and currency), or the like. The particular problem which exists is that each user may have a different locale requirement despite the fact that the system itself is oriented towards a single locale for a single process. Using existing utilities supplied by the underlying operating system (e.g., UNIX), the many users which may simultaneously use the system are all forced to use a single locale (i.e., the locale for which the system has been set up).

Another problem which exists is that each one of the users may be using a different character set. This is particularly the case when users are accessing the system from various locations around the world. A Japanese user might, for instance, be using a vendor-specific version of the Japanese Industrial Standard (such as shift JIS) character set. European users, on the other hand, might employ ISO 8859-1 character set, or such users might be using the Roman-8 character set from a Hewlett-Packard platform. Still further, a user might be employing the KOI-8 character set from a Russian environment. Here, a "character set" comprises the "character repertoire"—that is, the actual characters being used in a coded character set. The "coded" character set comprises the set of numeric codes employed to represent those characters. The actual numeric value used to represent a particular character may, in fact, vary from one character set to another.

Consider, further, the difficulties faced by an automobile manufacturer trying to deploy a customer information database for various automobile distributors, located in eleven different European countries speaking nine different languages. Each dealer who logs into the database system will do so from a host system which has been set up for a particular national language. Each dealer has the need for information to be returned from the database in a specific language. Also, each dealer has a need for the information to be correctly formatted, according to the dealer's local currency and date/time requirements. For such a database system, it is possible to perform conversions between the various character sets. Nevertheless, such an approach quickly becomes impractical as the company grows to include additional countries. In this all-too-common scenario, there exists a need to treat information from the various users in a consistent manner, with integrity across all applications.

To date, efforts to address these problems have been in the form of vendor-specific solutions. Such an approach is in itself problematic. For instance, such an approach is not easily portable across different platforms. Further, such an approach is typically not interoperable across heterogeneous environments. A solution fashioned in Windows NT, for instance, is not easily ported to a UNIX environment.

Even if one were to attempt to maintain multiple locales within a system (e.g., Windows NT), the approach is inefficient. Often, locale-specific information overlaps from one locale to another. For instance, many different locales employ a character set which is the same or very similar. It is an inefficient use of resources (e.g., system memory, storage, and the like) to maintain separate sets of locale-specific information for each individual locale.

For UNIX platforms, a set of standardized locale interfaces have been defined, for example, by the X-Open Consortium and Posix Group. These interfaces are oriented towards a single locale for a single process. Once one selects a particular locale, it serves as a global attribute employed for all processing which occurs in the application. For the system employed by the abovementioned international company, when a German user accesses the server, the server must stop all processing and transition over to German. Here, processing for all other users stops until the German user is finished. The other processes would have to either be suspended or use the locale which the whole global environment has been set up for, with potentially incorrect results.

As one changes from one platform to another, the character sets underlying each platform change; thus, the way in which one processes data changes. Simply put, there is no canonical representation of the data. Here, "canonical" refers to the ability to take any representation of the data and condense it down into one representation; for example, Roman number two, Arabic number two, and Hindi number two all canonically condense down to "2." A canonical representation assists with the goal of processing data in a consistent manner across all platforms and all locales. The Unicode Consortium and the ISO 10646 standard have provided a means for defining a canonical interface.

During operation, the system takes data from any source and converts it into canonical Unicode which, in turn, is used for all internal processing. Canonical Unicode does not, by itself, provide multi-threaded, multi-locale processing. For canonical Unicode, every time one migrates to a new platform or adds a new character set, it is necessary to create a new definition of that character set in order to get all the proper attributes for parsing (e.g., for determining whether the character is alphabetic, numeric, and so forth and so on).

What is needed is a system providing National Language Support (NLS) in application programs which is portable yet flexible. Such a solution should be suited for use on multiple platforms, yet be easily modified for accommodating additional attributes as culturally-sensitive information within the system grows. Such systems should be thread safe and should be able to handle multiple languages simultaneously. The present invention fulfills this and other needs.

GLOSSARY

ASCII: American Standard Code for Information Interchange; a sequence of 128 standard characters.

Code page: A character set, such as available in MS-DOS versions 3.3 and later, that provides a table for relating the binary character codes used by a program to keys on a keyboard or to the appearance of characters on a display.

Database: An organized collection of information.

Database Management System (DBMS): A system that controls the organization, storage, and retrieval of information in a database.

Enabling or Internationalization: Designing and coding a product so that it can be made to function for international use. A product is enabled if a national language version can be created at minimal expense and if it does not interfere with current or planned national language support of other products.

File: A collection of information stored under one name on a disk. For example, the system tables are stored in files.

Index: A file that determines an order in which the system can access the records in a table.

Localization: Translating and adding functions to an enabled product to accommodate a country's languages, conventions, and cultures.

National Language: A language or dialect spoken by any group of people.

National Language Support: The features of a product that accommodate a specific country, national language, local convention, culture, and the like.

Table: A structure made up of rows (records) and columns (fields) that contains information.

Unicode: A particular 16-bit character set, as defined by the Unicode Consortium. The term "Unicode," when used generally herein, refers to an encoded representation of a character in the Unicode character set; the encoding is fixed two bytes in length, with a variable-width encoding known as "UTF-8" (8-bit Unicode Transformation Format) available which may vary from one to three bytes in length. Different formats are available. One standard, ISO 10646, defines an international standard representation of Unicode.

SUMMARY OF THE INVENTION

A Client/Server Database System of the present invention comprises one or more clients connected to server(s) via a network. Each of the clients, which communicates with the server via the network, can be in a separate locale and employ locale-specific data (e.g., character sets, date and currency formats, and the like).

The server, which includes Sybase SQL Server™ database server (Sybase, Inc. of Emeryville, Calif.) in an exemplary embodiment, generally operates as an independent process (i.e., independently of the clients) running under a server operating system such as Microsoft Windows NT (Microsoft Corp. of Redmond, Wash.), NetWare (Novell of Provo, Utah), or UNIX (Novell). The network may be any one of a number of conventional network systems, including a Local Area Network (LAN) or Wide Area Network (WAN), as is known in the art (e.g., using Ethernet, IBM Token Ring, or the like). The network includes functionality for packaging client SQL calls and its parameters into a format (of one or more packets) suitable for transmission across a cable or wire, for delivery to the server.

In general operation, the client(s) store data in or retrieve data from one or more database tables. Typically resident on the server, each table itself comprises one or more horizontal rows or "records" (tuples) together with vertical columns or "fields." A database record includes information which is most conveniently represented as a single unit.

The server includes a conversion engine for processing locale-specific data. In operation, the conversion engine receives as its input locale-specific text or data from the clients. The conversion engine, in turn, emits Unicode as its output. Specifically, the locale-specific textual data is tagged with a locale identifier for allowing the conversion engine to propagate it into appropriate Unicode. After conversion into Unicode, the data from the clients generally undergoes further processing. Specifically, the Unicode output is provided to transformation process(es).

Examples of transformations include case mapping, Soundex mapping, lexical attribute determination, code set conversion, and character metric determination. Case mapping entails converting a character from lower case to upper case and vice versa. Soundex mapping includes generating Soundex weightings for both Latin and non-Latin languages (i.e., Asian, Cyrillic, and Arabic alphabetics). Lexical attribute determination includes determining whether a character is an alphabetic character, a digit, and the like. Code set conversion includes converting from any character set, including Unicode, into any other character set (including Unicode). Character metric determination includes determining how wide a character is in terms of data (storage) and in terms of column length (display).

The system provides data structures and processing methods for improving transformation processes. Specifically, base attributes for a default locale (e.g., U.S. English) are stored by the system in base attributes structure. Hanging off of this structure is a linked list of locale base structures. Depending on what is required for a given task at hand, any one of the locale base structures can be pointed to (i.e., de-referenced) during processing. Each of the locales can, in turn, point to various "trie" structures. A trie is a well-accepted mechanism for storing a sparse data set in a structure which only contains the information needed, and at the same time comprises information (i.e., pointers) about information which does not fit within the specific range of characters (i.e., trie entries). Each trie structure stores attribute information which is required. Sub-attribute structures can be shared or omitted, as needed, to preserve systems resources when processing. In the event that an attribute structure is not represented, the system employs the corresponding default attribute—that is, a default attribute contained within (or referenced by) the base attribute structure.

The "trie" structures represent a "stack of values," each one of which can have a set of attributes assigned to it. In particular, the character value of an incoming character (i.e., the character code point) is used to index into a first array. Based on the value stored thereat in the array, the system determines whether the value is an attribute or whether the value is instead a pointer to yet another array. The mechanism can also be employed for indexes other than character code points. For example, the values of 1 through 7 can be used to index into an array listing days of the week for a locale.

Given a base locale (i.e., a base reference point), multiple threads can be employed in a process, with each thread using as its root the same default locale or data structure which has been created (i.e., for the whole process). From the default locale, additional pointers are employed to access a locale-specific item. Each thread can point to its own default locale. During processing, each thread will look at its thread-specific locale for the information which is required. If the information cannot be located, the thread then reverts or falls back to the default locale for the final information. With this approach, redundancy of data is dramatically reduced. Additionally, the approach only requires one or two accesses to determine if locale-specific information exists.

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment where optimization of query performance is desirable, including non-SQL database management systems and the like. The description of the exemplary embodiments which follows is, therefore, for the purpose of illustration and not limitation.

Standalone (client) system

Figure 1A:
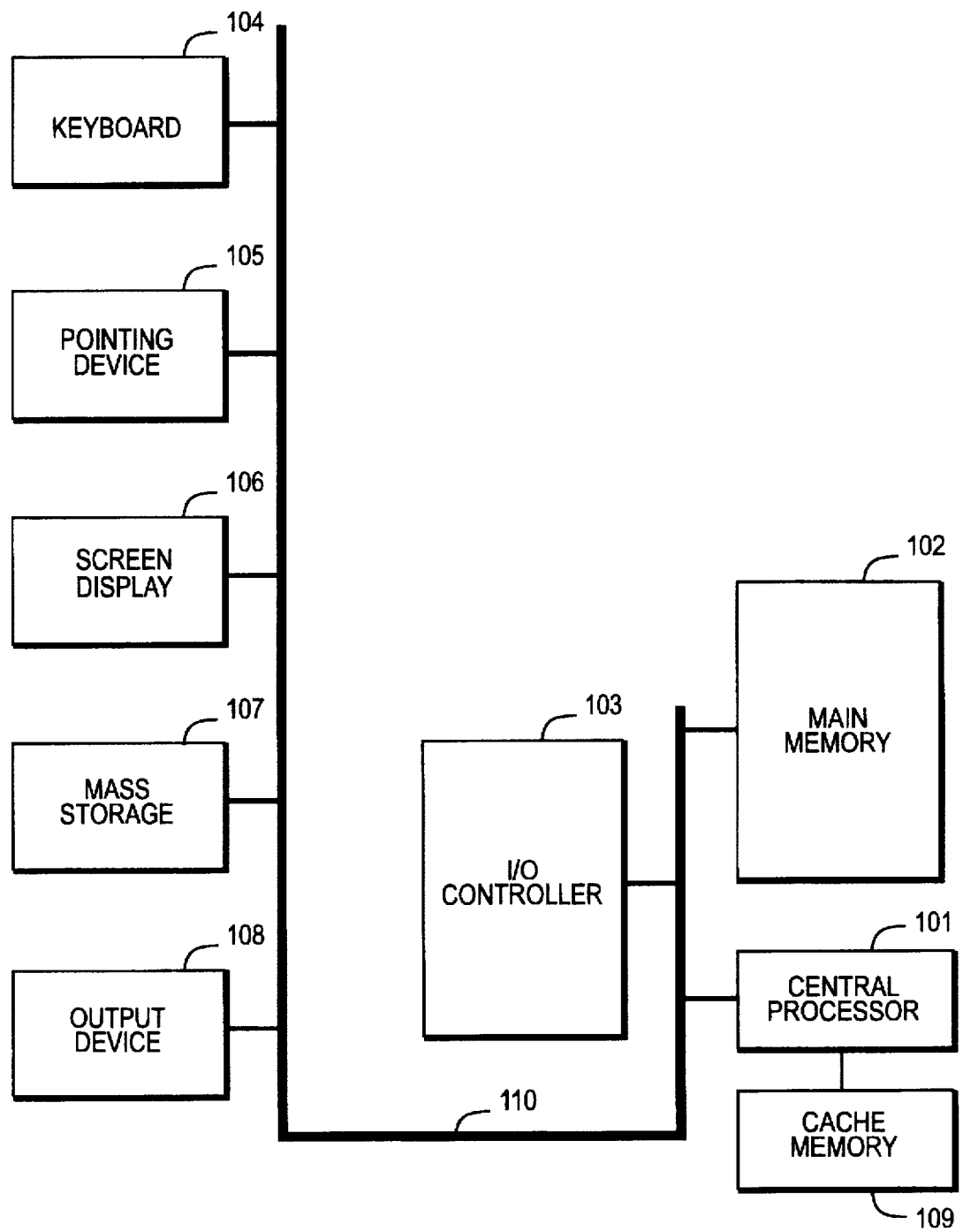
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a persistent or mass storage 107 (e.g., hard or fixed disk, removable or floppy disk, optical disk, magneto-optical disk, and/or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Figure 1B:
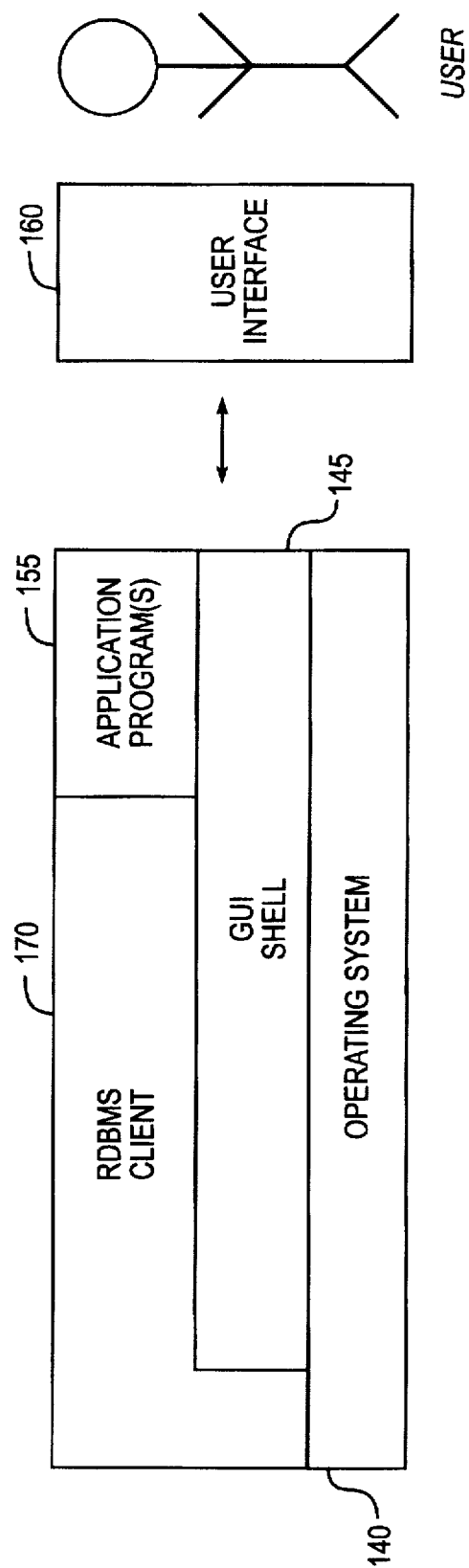
FIG. 1B is a block diagram of a software subsystem for controlling the operation of the computer system of Fig. 1A.

Illustrated in FIG. 1B, a computer software system 150 is provided for directing the operation of the computer system 100. Software system 150, which is stored in system memory 102 and on disk memory 107, includes a kernel or operating system (OS) 140 and a GUI (graphical user interface) shell 145. One or more application programs, such as application software 155, may be "loaded" (i.e., transferred from storage 107 into memory 102) for execution by the system 100. The system also includes a UI (user interface) 160 for receiving user commands as input and displaying user data as output. Although shown as a separate component, the UI 160 is typically provided by the GUI operating under the control of the OS 140, program(s) 155, and Relational Database Management System (RDBMS) client 170. The RDBMS client or "front-end" 170 itself may comprise any one of a number of database front-ends, including PowerBuilder™, dBASE®, Paradox®, Microsoft® Access, or the like. In an exemplary embodiment, the front-end will include SQL access drivers (e.g., Borland SQL Links, or Microsoft ODBC drivers) for accessing SQL database server tables in a Client/Server environment.

Client/server system providing multi-threaded data processing in a heterogeneous language environment A. General design considerations A particular problem with prior art attempts has been the tendency of engineers to focus their development efforts on the environment which one is working within. As a result, prior art attempts have included limitations dictated by platform-specific considerations. A better approach is to instead employ a "conversion envelope." For purposes of encoding data, all character-based processing occurs inside an application in Unicode. A "conversion envelope" is in effect placed on the exterior of the application in order to normalize all of the data into a canonical format—Unicode. In this manner, one can use data from any platform from any source, yet be able to use the data in a single consistent manner. By processing information in a consistent, canonical format, a system achieves consistency for maintenance, upgrading, debugging, and customer support, across all platforms.

B. Client/server database system

Figure 2:
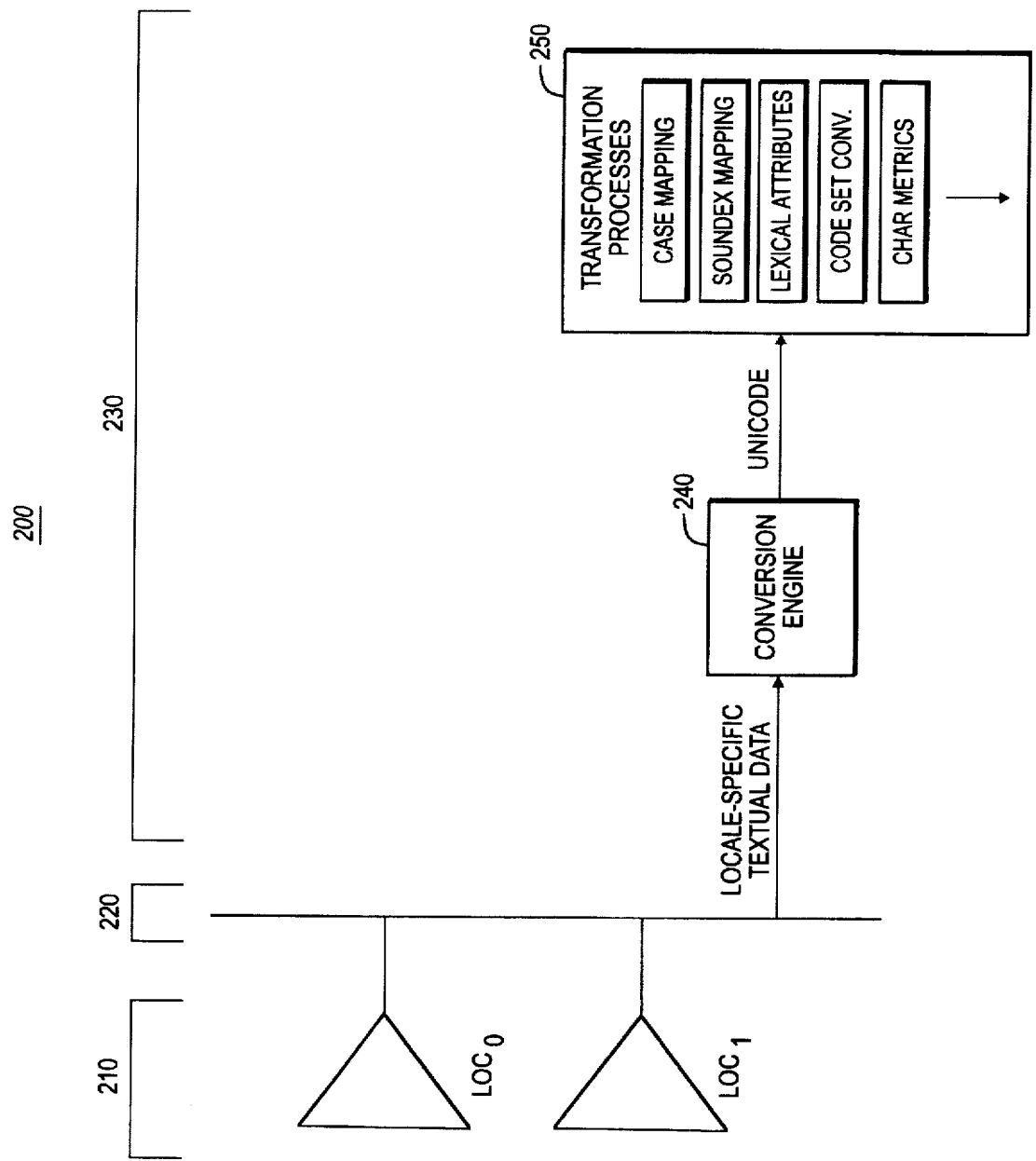
FIG. 2 is a block diagram of a client/server system in which the present invention is preferably embodied.

While the present invention may operate within a single (standalone) computer (e.g., system 100), the present invention is preferably embodied in a multi-user computer system, such as a client/server system. FIG. 2 illustrates the general structure of a Client/Server Database System 200 which is preferred for implementing the present invention. The system 200 comprises one or more clients 210 connected to server(s) 230 via a network 220. Each of the clients 210, which communicates with the server 230 via the network 220, can be in a separate locale, such as $Loc_0$ and $Loc_1$, and employ locale-specific data (e.g., character sets, date and currency formats, and the like).

The server 230, which includes Sybase SQL Server™ database server (Sybase, Inc. of Emeryville, Calif.) in an exemplary embodiment, generally operates as an independent process (i.e., independently of the clients) running under a server operating system such as Microsoft Windows NT (Microsoft Corp. of Redmond, Wash.), NetWare (Novell of Provo, Utah), or UNIX (Novell). The network 220 may be any one of a number of conventional network systems, including a Local Area Network (LAN) or Wide Area Network (WAN), as is known in the art (e.g., using Ethernet, IBM Token Ring, or the like). The network includes functionality for packaging client SQL calls and its parameters into a format (of one or more packets) suitable for transmission across a cable or wire, for delivery to the server 230.

In general operation, the client(s) 210 store data in or retrieve data from one or more database tables. Typically resident on the server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

During a database session or "connection" with the server, each client issues one or more SQL commands to the Server. SQL commands may specify, for instance, a query for retrieving particular data (i.e., data records meeting the query condition) from a database table. The syntax of SQL (Structured Query Language) is well documented; see, e.g., Date, C., *An Introduction to Database Systems*, Volume I and II, Addison Wesley, 1990; the disclosure of which is hereby incorporated by reference. In addition to retrieving the data from database server tables, the clients also include the ability to insert new rows of data records into the table; clients can also modify and/or delete existing records in the table.

Client/server environments, database servers, and networks in general are well documented in the technical, trade, and patent literature. For a general discussion of database servers and client/server environments, see, e.g., Nath, A., *The Guide to SQL Server*, Second Edition, Addison-Wesley Publishing Company, 1995. For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

As shown, the server 230 of system 200 includes a conversion engine 240, for processing locale-specific data. In operation, the conversion engine 240 receives as its input locale-specific text or data from the clients 210. The conversion engine 240, in turn, emits Unicode as its output. Specifically, the locale-specific textual data is tagged with a locale identifier for allowing the conversion engine 240 to propagate it into appropriate Unicode. After conversion into Unicode, the data from the clients generally undergoes further processing. As shown in the figure, the Unicode output is, for this purpose, provided to transformation process(es) 250.

C. Transformations

Examples of transformations include case mapping, Soundex mapping, lexical attributes determination, code set conversion, and character metrics determination. Case mapping entails converting a character from lower case to upper case and vice versa. Soundex mapping includes generating Soundex weightings for both Latin and non-Latin languages (i.e., Asian, Cyrillic, and Arabic alphabetics). Lexical attribute determination includes determining whether a character is an alphabetic character, a digit, and the like. Code set conversion includes converting from any character set into Unicode, and from Unicode back into any character set. Character metric determination includes determining how wide a character is in terms of data (storage) and in terms of column length (display).

Another transformation is transliteration. Transliteration is the process of transforming a character from one script into another script. For instance, the Spanish "ñ" can be transliterated into the English "n." Alternatively, the character could be transliterated into a Russian character. The process of transliterating from a Russian character, on the other hand, to a Latin character, is different depending on which language is the target language. For instance, transliteration of a Russian character to English, French, or Swedish might yield three different characters all from the same character set, since the process is operating based on phonetic quantities. Therefore, a separate transliteration map might be required for each language. Regardless of the particular transformation employed, the processing usually entails transforming the data from one state to another, such as converting one string of characters into another string of characters. The transformation might comprise transforming the data into a new character set, or transforming a phonetic quantity into a sound value.

Transformations can be divided into static and dynamic transformations. In Unicode, for instance, there exists the notion of decomposition and precomposition. For example, a character which includes an accent mark would have a precomposed view with the accent mark and a decomposed view of a character plus an accent mark (i.e., two separate entities). Such an attribute is a "static" attribute in the sense that it remains unchanged. Transformation of a character with an accent mark into Unicode is a "static transformation" process. After transforming into Unicode, such a character can undergo a wide variety of transformations.

Other transformations may not be static. Examples of these non-static or "dynamic transformations" include case mapping. For French used in Canada, when a character having an accent mark is converted to upper case, the accent mark is preserved or carried over to the upper case letter. In France, in contrast, the accent mark would be dropped. Upper casing in this instance is not static. It is, instead, locale specific. In a similar manner, the way in which data is sorted typically varies from one locale to another and, hence, represents a "dynamic transformation." Similarly, encoded sound or "Soundex" tends to change on a locale-by-locale basis and, therefore, also represents a dynamic transformation.

D. Preferred representation of attribute information

Figure 3:
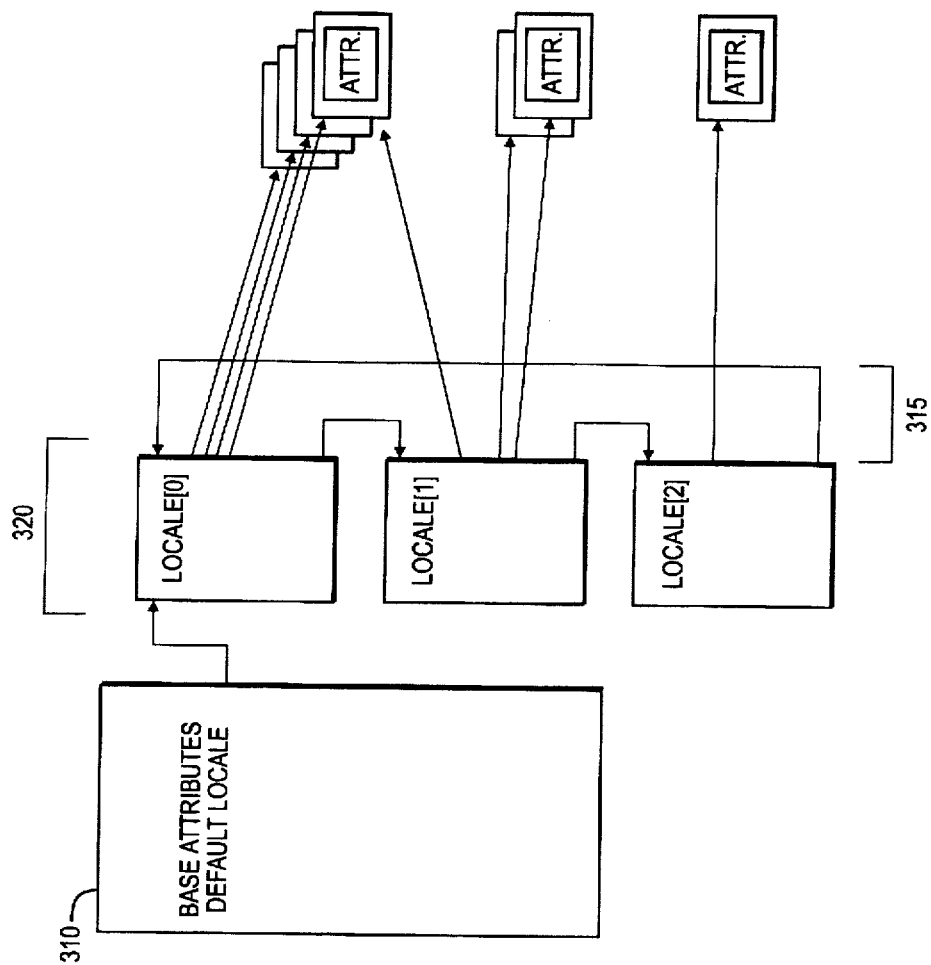
FIG. 3 is a block diagram showing a structural representation or view of static and locale-specific (dynamic) attributes.

At the outset, it is helpful to first examine certain data structures employed by the system of present invention. Specifically, the system employs a structural representation or view 300 of static and locale-specific (dynamic) attributes, as shown in FIG. 3. Here, base attributes for a default locale (e.g., U.S. English) are stored in base attributes structure 310. Hanging off of structure 310 is a linked list 315 of locale base structures 320. Depending on what is required for a given task at hand, any one of the locale base structures can be pointed to (i.e., de-referenced) during processing. Each of the locales can, in turn, point to various "trie" structures. A trie is a well-accepted mechanism for storing a sparse data set in a structure which only contains the information needed, and at the same time comprises information (i.e., pointers) about information which does not fit within the specific range of characters (i.e., trie entries).

Each trie structure stores attribute information which is required. The structural view 300 represents, therefore, a base default locale having a number of specific, sparsely populated locale structures hanging off of it. Sub-attribute structures can be shared or omitted, as needed, to preserve systems resources when processing. In the event that an attribute structure is not represented, the system employs the corresponding default attribute—that is, a default attribute contained within (or referenced by) the base attribute structure 310. This design encourages a high degree of sharing, such as between slightly different versions of the same language (e.g., Canadian French and "French" French).

F. Tries: stack of values

As described above, the system of the present invention employs sparsely-populated arrays or "trie" structures for representing attribute information. These structures represent a "stack of values," each one of which can have a set of attributes assigned to it. In particular, the character value of an incoming character (i.e., the character code point) is used to index into a first array. Based on the value stored thereat in the array, the system determines whether the value is an attribute or whether the value is instead a pointer to yet another array. The mechanism can also be employed for indexes other than character code points. For example, the values of 1 through 7 can be used to index into an array listing days of the week.

Given a base locale (i.e., a base reference point), multiple threads can be employed in a process, with each thread using as its root the same default locale or data structure which has been created (i.e., for the whole process). From the default locale, additional pointers are employed to access a locale-specific item. Each thread can point to its own default locale. During processing, each thread will look at its thread-specific locale for the information which is required. If the information cannot be located, the thread then reverts or falls back to the default or base locale for the final information. If the information cannot be found in the base locale, then the condition is communicated back to the calling thread or application. With this approach, redundancy of data is dramatically reduced. Additionally, the approach only requires one or two accesses to determine if locale-specific information exists.

G. Trie-based transformation method

1. Traversing trie structures

Figure 4:
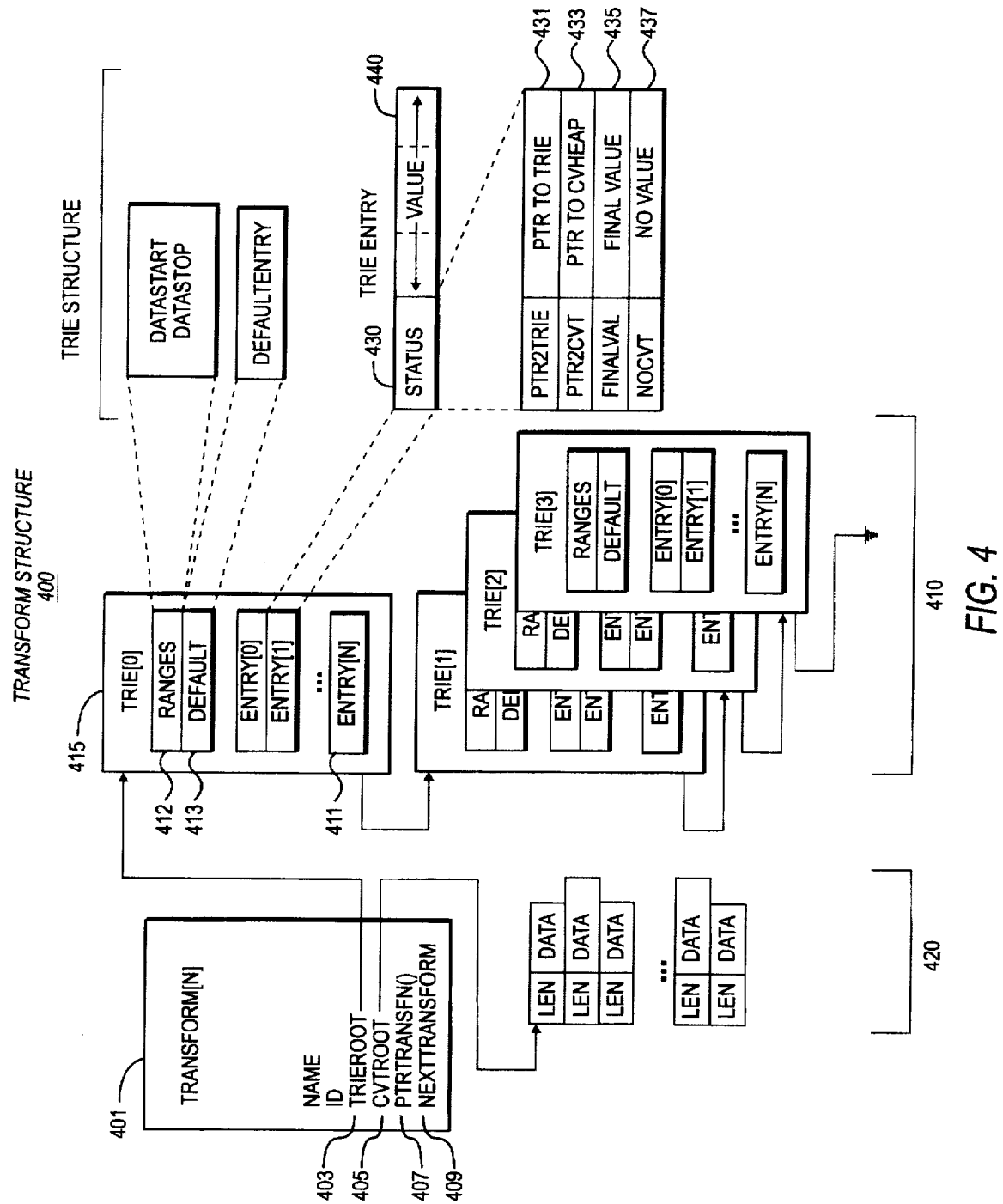
FIG. 4 illustrates a generic transform structure 400, which is loaded at runtime (e.g., from external files), for transforming from one character set to another.

Transformation, in accordance with the present invention, is perhaps best illustrated by describing a transformation from one character set to another. FIG. 4 illustrates a generic transform structure 400, which is loaded at runtime (e.g., from external files), for transforming from one character set to another, such as transforming an incoming character from a Unicode value to a new value (which is not necessarily Unicode). The generic structure 400 itself comprises at least one transform record or structure 401 which, in turn, references other nested structures via a trie root 403 pointing to a linked list of trie structures 410, a conversion root 405 pointing to a conversion heap 420, a pointer-to-transform function 407, and a pointer-to-next transformation 409 (i.e., next transform structure). The remaining elements of structure 400 are described in conjunction with FIG. 5.

Figure 5:
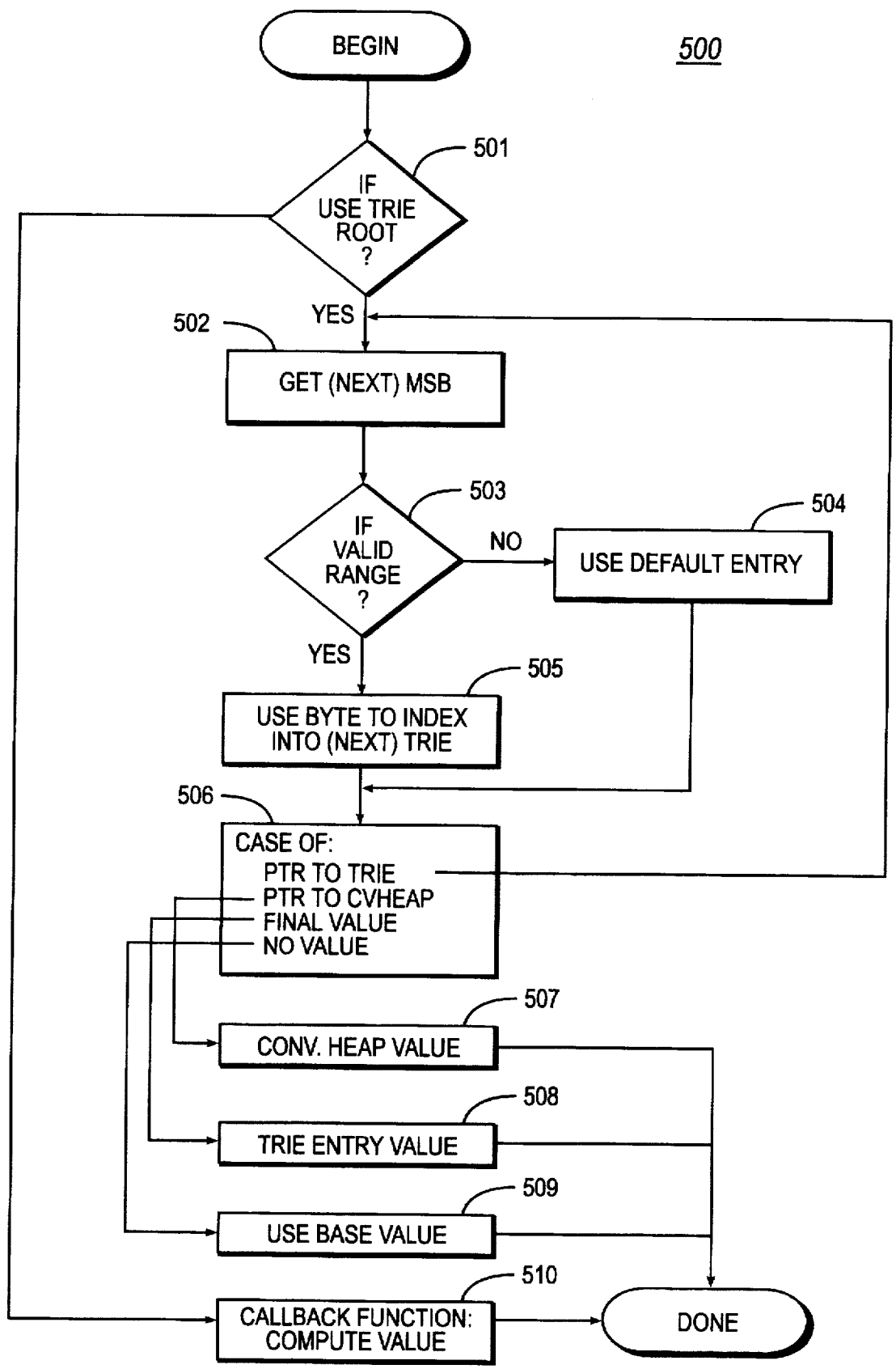
FIG. 5 illustrates a method of the present invention for navigating trie structures.

FIG. 5 illustrates a method 500 of the present invention for navigating trie structures. Step 501 represents a determination of whether a valid trie root entry exists in the transform structure 401. If a valid trie root does not exist, the system employs a transform callback function, which is accessed via pointer-to-transform function 407, as shown at step 510. After executing the callback function, the method is done.

In typical operation, the method employs the trie root (i.e., "yes" at step 501) and proceeds as follows. Starting from the most significant byte (MSB), each successive byte of the incoming character (e.g., a multi-byte character) is successively employed to point into subsequent tries, and so forth and so on until the ultimate value desired is retrieved. For processing a Unicode character, for example, the MSB of the incoming Unicode character is initially employed. Step 502 represents the extraction of the (next) MSB from the character. At step 503, method checks to make sure that the byte is within the acceptable range of byte values. The range is defined by stored ranges (datastart and datastop) 412, which are stored in the trie 415. If the MSB is not within the acceptable range, the default entry or value 413 for the trie is simply used instead, as shown by step 504; in such a case, step 505 is skipped.

The range and default entries are followed by an array of trie entries which, in a preferred embodiment, comprises 256 entries. The method uses the incoming MSB byte value for indexing into a particular one of these entries, at step 505. This step corresponds to indexing into entry 411 of the trie 415. Each trie entry itself stores status flags or bits 430 followed by a trie entry value 440.

Step 506 illustrates that the next action taken depends on the setting of the status bits. As shown by status entries 431, 433, 435, 437 of FIG. 4, the status bits can store the following values:

1. PTR2TRIE: Pointer to trie (431);

2. PTR2CVT: Pointer to conversion heap (433);

3. FINALVAL: Final value (435); and

4. NOCVT: No value (437).

The status found at the trie entry, therefore, allows the method to determine whether the entry stores a pointer to another trie, a pointer to a conversion heap, a final value, or no value.

If the status bits indicate that the final value is present at this point, the value is read from the trie entry at step 508 and used accordingly. Note that the final value is, in this instance, being employed without further checking of the value of the remaining byte(s) (i.e., least significant byte(s)). An example of such an instance would be a Unicode character which requires determination of character attributes of Chinese or Japanese ideographs. In other words, when processing Asian ideographic characters, for instance, the system can determine by looking at the first byte (indexing into a trie structure) that the character is in fact an ideographic character, despite the fact that the character is a multi-byte character (e.g., 2-byte Unicode character). Here, one finds the same lexical properties—ideographs—regardless of the value of the subsequent byte.

If the entry stored a pointer-to-trie entry, on the other hand, the method would continue to the next trie as pointed to by the pointer-to-trie (i.e., PTR2TRIE), looping back to step 502 as shown. The process can continue to an arbitrary level of nesting, thereby extending a chain of trie entries indefinitely. The method continues to "walk down" the chain of trie entries until the desired entry is finally reached.

Step 509 indicates that no value is found in the tries. In such a case, the method can use the base attributes from the default locale, as previously described. Step 507, on the other hand, indicates a case where the status bits indicate that the conversion heap is to be used. Both this case and the callback function case are treated as "exception processing"—that is, each represents an exception to the general approach of storing attributes as trie entries. These will now be described in further detail.

2. Exception processing a. Conversion heap

Ordinarily the transformation data itself—that is, the final result which is sought—can be stored as an item or entry in a trie structure. Certain attribute information cannot be stored within a trie entry or slot, however. Thus, the trie structures also operates in conjunction with a transform or "conversion" heap. The conversion heap is employed for results which are too big to be stored within a trie structure, such as a long string result. Such a result can be easily stored in the conversion heap where it is "pointed to" by a trie structure entry (i.e., a conversion heap pointer). Typically, short, fixed-length items are stored in the trie entry slots; larger, variable length items are stored in the conversion heap. Thus, the conversion or transform heap is employed for transforms where the result may be longer than that of the fixed-length trie entry (e.g., longer than three bytes, for a UTF-8 embodiment).

Figure 6:
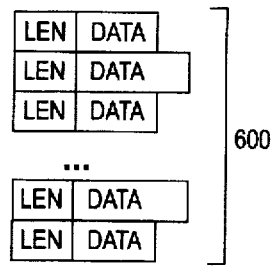
FIG. 6 is a block diagram showing a transform or conversion heap used in the system of the present invention.

As shown in FIG. 6, a conversion heap 600 comprises a heap list of variable length values. Specifically, the heap comprises a plurality of length/data entries, each storing a length followed by actual data. This is useful, for instance, in the upper casing of the German β (pronounced "ess-zet"). Upper casing of the β character yields SS—a value which requires four bytes in Unicode (two bytes for each S). Such a result will not fit in a three-byte trie entry (i.e., the currently-preferred embodiment). Therefore, the corresponding trie entry is used instead to point into the conversion heap to an entry comprising a length of four for storing SS in Unicode.

Figure 7:
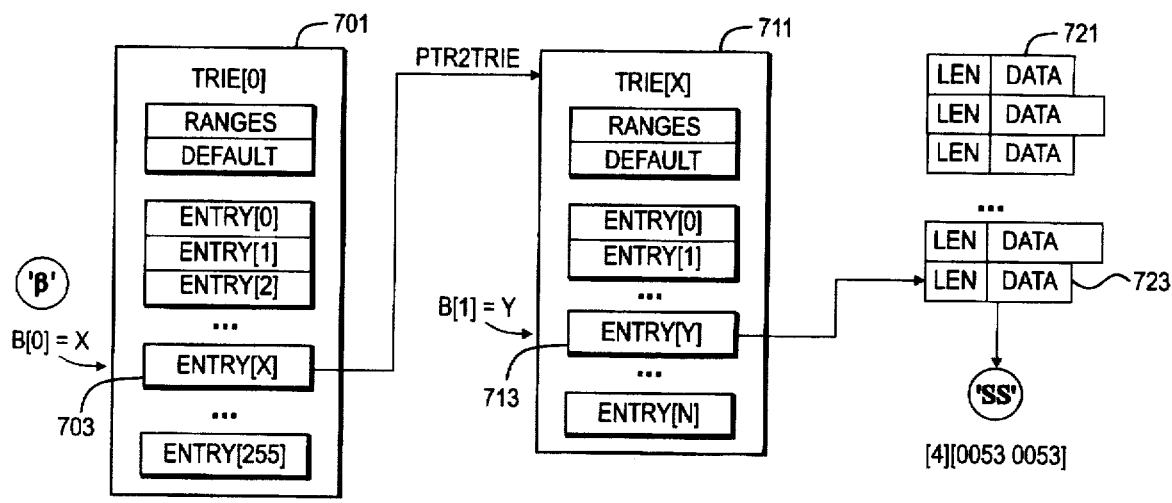
FIG. 7 is a block diagram showing use of the transform or conversion heap of FIG. 6.

FIG. 7 illustrates this process. The first byte is used to index into the first trie 701. From the corresponding entry 703, the system indexes into a second trie 711. Specifically, a pointer-to-trie is found at entry 703; its value is used to get to the next trie (i.e., trie 711). Then, the next byte of the character is then used to index into the second trie 711. The indexed-into trie entry 713 which is found stores a pointer which points to conversion element 723 in conversion heap 721. The transform or conversion element 723 itself stores the actual data: SS.

b. Callback function

Figure 8:
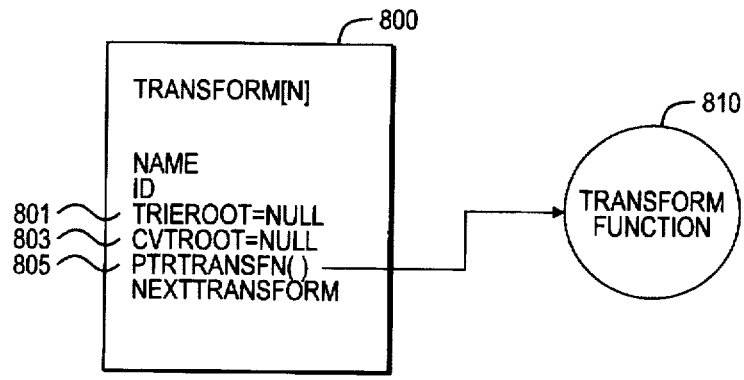
FIG. 8 is a block diagram showing a generic transform structure used in the system of the present invention.

The system of the present invention allows a specific transformation function to be registered with the system via a callback mechanism. This would be employed, for example, in instances where the linked list of trie structures and the conversion heap cannot provide the needed transformation, such as when the transformation must be computed. As previously shown in FIG. 4, the transform structure 400 stores a transform function pointer 407 for referencing a "callback" function. In such an instance, the callback function is invoked instead for effecting the required transformation, such as illustrated in FIG. 8. As shown by transform structure 800, both trie root 801 and conversion root 803 are set to NULL. Transform function pointer 805, however, stores a value—a pointer to transform function 810. In this manner, the user/developer supplied function can be called for effecting the transformation.

3. Advantages of trie-based transformation method

Use of trie structures is particularly advantageous. These data structures, which are loaded at runtime (e.g., from external files), can be created by an external utility. This allows one to supply trie structures in the field (i.e., at customer sites) without having to change or otherwise modify the executable binaries. Each locale-specific trie structure can then be loaded in by an executing program on a locale-by-locale basis. Since manipulation of the underlying data remains unchanged regardless of the underlying platform, increased portability is achieved.

H. Application of trie-based transformation method to Soundex

Soundex is a method for coding words, mainly surnames in English, so that names that sound alike have the same code. According to Don Knuth in *The Art of Computer Programming—Vol. 3: Sorting and Searching*, the Soundex method was originally developed by Margaret Odell and Robert Russell and was patented (U.S. Pat. Nos. 1,261,167 (1918) and 1,435,663 (1922)). The general approach is as follows:

1) Retain the first letter of the name. Drop all occurrences of A, E, H, I, O, U, W, and Y in other positions.
2) Assign the following numbers to the remaining letters after the first:

| | | |
|---|---|---|
| Labials | B, F, P, V | 1 |
| Gutterals and sibilants | C, G, J, K, Q, S, X, Z | 2 |
| Dentals | D, T | 3 |
| Long liquids | L | 4 |
| Nasals | M, N | 5 |
| Short liquids | R | 6 |

3) If two or more letters with the same code are adjacent in the original name, omit all but the first.
4) Convert to the form "letter, digit, digit, digit" by adding trailing zeros or dropping rightmost digits.

With some minor changes to the weighting scheme used, Soundex has been applied to languages other than English.

Traditional Soundex has inherent problems. Since the first letter always stays the same, strings like "Kathy" and "Cathy" yeild very different Soundex values. As another problem, Soundex is primarily designed for use with English; it is not particularly well suited for use with non-English languages. Moreover, there has been little or no effort to date to use Soundex for providing summary phonetic representations of non Latin-based languages (e.g., Russian, Japanese Kana, and the like).

According to the present invention, the trie-based transformation approach is employed to adapt the Soundex method for non Latin-based languages. In particular, one additional element is added to the trie-based data structure. For a locale, the element takes the phonetic letters A through Z, with a Soundex quantity assigned to it. Using the above-described trie structure, a value can be resolved in the range of A to Z, thus yielding a value which is valid for Soundex. In essence, the approach is one of performing a transliteration from one character set (e.g., script) into a non-accented Latin character repertoire, on a locale-by-locale basis. Once the transliteration to the Latin equivalents has been performed, conventional Soundex methodology can be applied for further processing (e.g., matching).

Consider, for example, the following Japanese Kana syllables: しよはん

These four characters would be transliterated into the following strings: "sho", "yo", "ha", and "n". Based on those quantities, the resulting string is mapped into Latin characters to which traditional Soundex can be applied.

The approach allows phonetic matching across locales. In Japan, for instance, a customer's name could be entered into a database in Kana, in Kanji, or in Latin (Roman) characters, depending on whether the worker who entered the particular name was a Japanese worker or a visiting worker. Using the trie-based Soundex approach, one can look up a customer's name despite the fact that it is stored in a particular locale-specific format. By adding a Soundex extension to locale attributes, the trie-based, thread-safe locale mechanism allows Soundex to be applied successfully to other languages and scripts as well.

Detailed construction and operation of data structures

A. Multi-threaded transformation data structures

1. General approach

Figure 9:
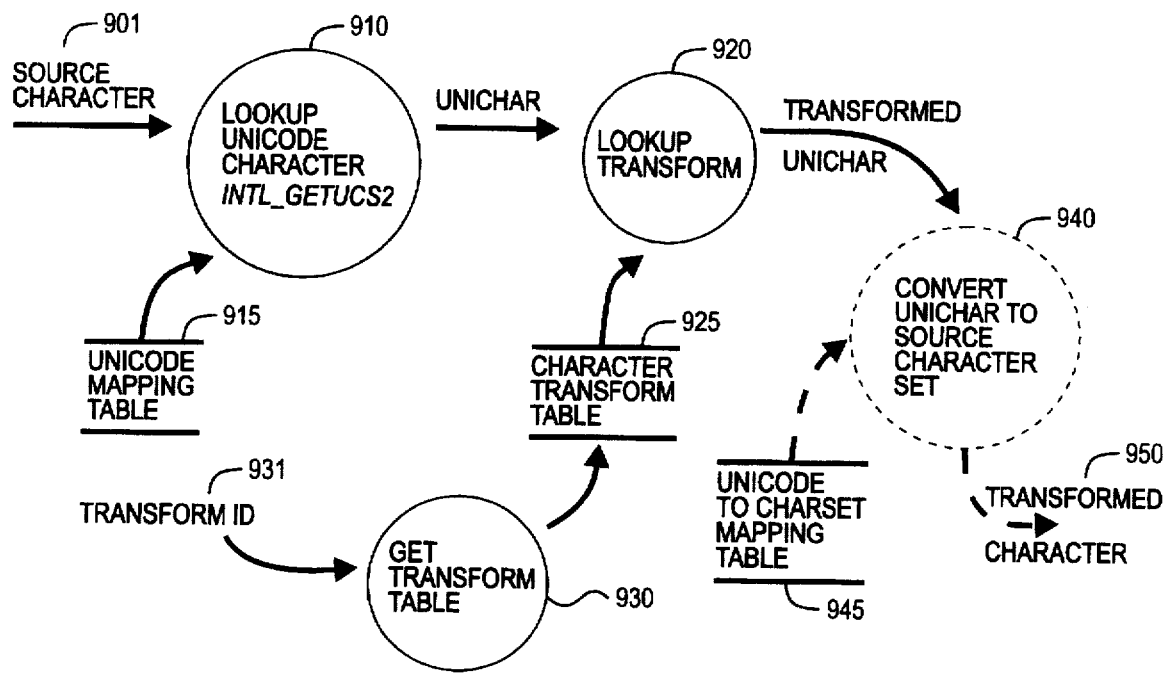
FIG. 9 illustrates an overall approach of the present invention for performing transformations.

FIG. 9 illustrates an overall approach of the present invention for performing transformations. Initially, a source character 901 enters a first process 910 which performs a Unicode character lookup. The process 910 performs the lookup using a Unicode mapping table 915, as shown. The Unicode mapping table is itself pointed to by a CHAR__ATTRIB structure, which serves as the root. The CHAR__ATTRIB structure functions as the central repository of character set information, including information about character width, attributes, case mapping, Soundex information, SQL language character normalization, and other transformations/conversion to and from other character sets.

Once the Unicode character ("unichar") is retrieved, the character can be employed to lookup various transformations, by indexing into the CHAR__ATTRIB structure. In this manner, the system can lookup various transformations and character attributes, perform mapping into another character, determining a Soundex quantity, or the like. Here, the code point of the character is used as an index into the table. The actual lookup is performed by a generic lookup transform function, shown at 920. The lookup transform process 920 employs a character transform table 925. Another process, get transform table process 930 provides a transform ID 931 (i.e., a context). The character transform table 925 returns a transformed unichar, in a consistent format.

Process 940 represents conversion from Unicode back into a platform-specific character set (i.e., source character set). The process is shown in dashed line, however, since conversion back to the source character set may not be required (depending on application). The process 940 employs a Unicode to platform-specific character set mapping table 945, for performing the conversion. Ultimately, a transformed character 950 is emitted.

2. Construction of character attribute data structure

The character attribute or CHAR__ATTRIB structure, in conjunction with various in-memory mapping tables, is employed to transform character strings into other elements. In an exemplary embodiment, the structure may be constructed as follows (using the familiar C programming language).

```
CHAR__ATTRIB Structure
typedef struct char__attrib
{
    short   cs_status;                      /* Status flags            */
    BYTE    cs_class;                       /* Type of character set   */
    BYTE    cs_id;                          /* Character set ID        */
    short   cs_namelen;                     /* Length of the name      */
    BYTE    cs_name[MAXNAME];               /* Name of characters      */
```

```
BYTE         cs_maxcharlen;      /* Max char length        */
BYTE         cs_ncharsize;       /* Average nchar len      */
BYTE         cs_nnorm;           /* No. of Class 2 norm maps      */
BYTE         cs_ntype;           /* No. of Class 1 or 2 type maps */
BYTE         cs_nsoundex;        /* No. of Class 1 or 2 soundex maps */
short        cs_uniconv_cid;     /* UIL Character Set ID for conversion  */
                                 /* UNICONV_CID_UNKNOWN if not in */
                                 /* UIL core set           */
BYTE         spare[1];           /* Word boundry padding   */
BYTE         *cs_width_map;      /* Width of chars         */
CS_NORM_MAP  *cs_norm_map;       /* Class 2 Normalization maps   */
CS_TYPE_MAP  *cs_type_map;       /* Class 1 or 2 Type maps       */
CS_SOUNDEX   *cs_soundex;        /* Class 1 or 2 Soundex maps    */
/* Class3 specific structure starts here to allow for backward compat. */
CS_TRANSFORM *cs_CharToUCS2;     /* Map to two-byte Unicode (USC2) */
CS_TRANSFORM *cs_UCS2toChar;     /* Mapping from Unicode back */
CS_SOUNDMAP  *cs_toSound;        /* Class 3 Soundex Mapping */
CS_TRANSFORM *cs_toQtMatch;      /* Right-of-Pair match quote */
CS_TRANSFORM *cs_locToUpper;     /* Localized Upper Case Mapping */
CS_TRANSFORM *cs_locToLower;     /* Localized Lower Case Mapping */
CS_SOUNDMAP  *cs_locToSound;     /* Localized Soundex Mapping */
CS_TRANSFORM *cs_transNext;      /* Pointer to more Transforms */
} CHAR_ATTRIB;
```

The CHAR_ATTRIB structure stores attribute information helpful for mapping from a given source character set into Unicode.

Figure 10:
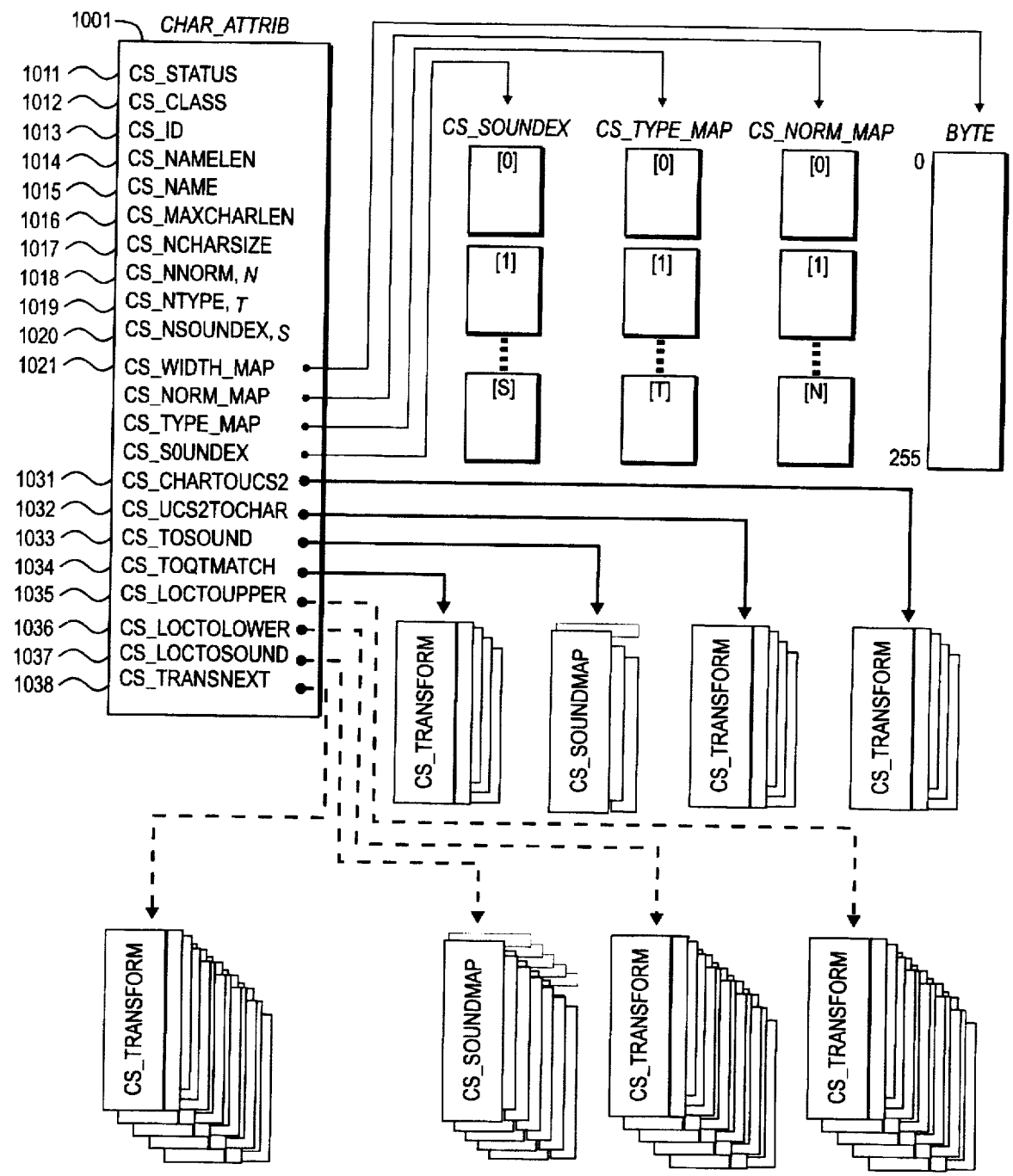
FIG. 10 illustrates diagramatically the layout of a character attribute structure.

FIG. 10 illustrates diagramatically the layout of this structure. The initial entries in the CHAR_ATTRIB structure 1001 store housekeeping/compatibility information, providing information about the source character set. Status information 1011, cs_status, stores status information which facilitates improving performance of processing. For a multi-byte character set, for instance, status information indicates whether this system recognizes white space as being only single-byte spaces or, on the other hand, as both single-byte and double-byte spaces. For Unicode character sets, status information can store a Unicode level (e.g., level 1, 2, or 3). Status information 1011, therefore, stores status information about generic attributes for the character set which is being processed.

The class field 1012, cs_class, indicates whether the character set is class 1 (single-byte only), class 2 (multi-byte Sybase character set), or class 3 (multi-byte Unicode with enhanced attributes). Character ID 1013, cs_id, is a unique ID for the character set. This enables the system to identify a particular source character set (e.g., Eastern European version of a Microsoft Windows character set—code page 1256). The field is an integer field for facilitating this identification.

The next two fields, name length 1014 (cs_namelen) and name 1015 (cs_name), store the human-readable name which is given to the character set. Maximum character length 1016, cs_maxcharlen, stores the maximum length that any single character can have in the set. For American and most European character sets, this stores a value of 1—that is, 1-byte width. For several Asian character sets, on the other hand, the maximum character length can span 3 or 4 bytes, or more. National character size 1017, cs_ncharsize, is employed for the SQL programming language. This stores the size of the average character used for the national character set; it is employed for backwards compatibility.

Number of normalization maps 1018, cs_nnorm, indicates the number of normalization maps. Normalization maps, which are used for class 2 character sets, allow the system to normalize multi-byte character sets to ASCII. For example, a double-byte character "A" can be normalized into a single-byte ASCII character "A." For class 3 character sets, this field stores a NULL value (as the character set would instead use the above-described transformations).

Number of type maps 1019, cs_ntype, stores the number of type maps. Type maps, which are employed for class 2 character sets, comprise linked structures employed for indicating particular character attributes (e.g., alphabetic determination, upper and lower casing, and the like). Class 3 character sets, in contrast, depend on an underlying Unicode library. Determination of normalization maps for class 3 character sets are based on Unicode rules. See e.g., *Unicode Standard Worldwide Encoding*, version 2.0, by the Unicode Consortium, Inc., 1965 Charleston Road, Mountain View, Calif. 94043 (unicode-inc@HQ.M4.metaphor.com). By using a single underlying library, one can avoid adding character attribute maps for every character set. For a class 3 character set, the type maps are employed for determining special attributes which are not covered by the Unicode Consortium's mapping tables.

Number of Soundex maps 1020, cs_nsoundex, stores the number of Soundex maps in place, for a class 2 character set. As previously described, a limitation with older character sets is that Soundex values were available only for Latin characters. The width map 1021, cs_width_map, points to a 256-byte long table which, based on the first byte of any character, indicates the data width of the character. Given a character which is 3-bytes long, for instance, the first byte of the character is used as an index into the table. The value stored thereat is equal to 3, for indicating that two additional bytes follow.

Fields 1031 and 1032 reference mapping tables. In particular, this allows the system to transform from the present character set to a two-byte Unicode (UCS-2) character and vice versa. cs_CharToUCS2 maps from the character set to Unicode. cs_UCS2toChar maps back from Unicode to the character set.

The "to Sound" field 1033, cs_toSound, points to a set of structures based on the transform structure, for determining a Soundex value. The approach is flexible in that the character can be mapped into a string to get the Soundex value, for both English and non-English characters. The "to Quote Match" field 1034, cs_toQtMatch, is employed for finding matching quotes. Given a delimited quote at the beginning of a string, the field 1034 can be employed to determining a string of all possible closing quotes.

Next, the CHAR_ATTRIB structure includes (optionally) pointers to locale-specific structures for upper case mapping, lower case mapping, and Soundex mapping, as shown at 1035, 1036, and 1037. Each drops into a linked list of structures; one which is unique based on a locale identifier. This allows additional locale-specific layers to be placed on the route.

Finally, the CHAR_ATTRIB structure terminates in a pointer 1038, cs_transNext, to a linked list of generic transform structures, each of which has a named value within it. If needed, an application can load at runtime a new transform structure, without having to change the binary of the program itself. Using the same generic procedures as previously described (i.e., trie navigation), new transformations can be added as desired, thus providing enhanced extensibility.

3. Construction of transform data structure

As shown in FIG. 10, the CHAR_ATTRIB structure references (i.e., points to) various transform structures. In an exemplary embodiment, a transform structure may be constructed as follows.

nite indirection). CSTFSTAT_CVTROOT is a status flag indicating that the conversion root field is in use, for getting variable length results. Finally, CSTFSTAT_FNONLY is a status flag indicating that the supplied function should be used; no tables are used.

The type field 1112, cstf_type, stores the type of transformation. Valid types in an exemplary embodiment, are as follows.

1003: Class 1 8-bit to 8-bit conversion table
3003: Class 3 multibyte to many conversion table
4003: Case and quotes mapping tables
6003: Miscellaneous transformation tables Type 1003 is for class 1 (single-byte) characters using only an 8-bit conversion table. Type 3003 represents a class 3 (single and multi-byte) character set with a transform allowing one to convert from multi-byte characters to any number of characters. Type 4003 indicates a transform table employed for mapping between upper and lower case and for matching quote characters. Finally, type 6003 indicates

```
typedef struct cs_transform
{
    short       cstf_status;       /* Status flags                                  */
    short       cstf_type;         /* Type of transform                             */
    short       cstf_id;           /* Transform ID                                  */
    short       cstf_localeID;     /* ID for locale, zero is default                */
    short       cstf_namelen;      /* Length of the name                            */
    BYTE        cstf_name[MAXNAME]; /* Name of Transform, e.g. "CharToUCS2"         */
    short       cstf_frommmlen;    /* length of "from" name                         */
    BYTE        cstf_fromname[MAXNAME];    /* name of "from" state                  */
    short       cstf_tonmlen;      /* length of "to" state name                     */
    BYTE        cstf_toname[MAXNAME];    /* name of "to" state                      */
    CSTF_TRIE   *cstf_trieRoot;    /* Root trie structure                           */
    CSTF_CVT    *cstf_cvtRoot;     /* Root of transform heap                        */
    short       cstf_fouConvNameLen; /* Length of name of cvt fn to use             */
    BYTE        cstf_fouConvName [MAXNAME];
    (CS_RESULT *) () cstf_fouConv;    /* Conversion function to use */
    CS_TRANSFORM *cstf_nextTransform; /* Pointer to next struct. */
}CS_TRANSFORM;
```

Figure 11:
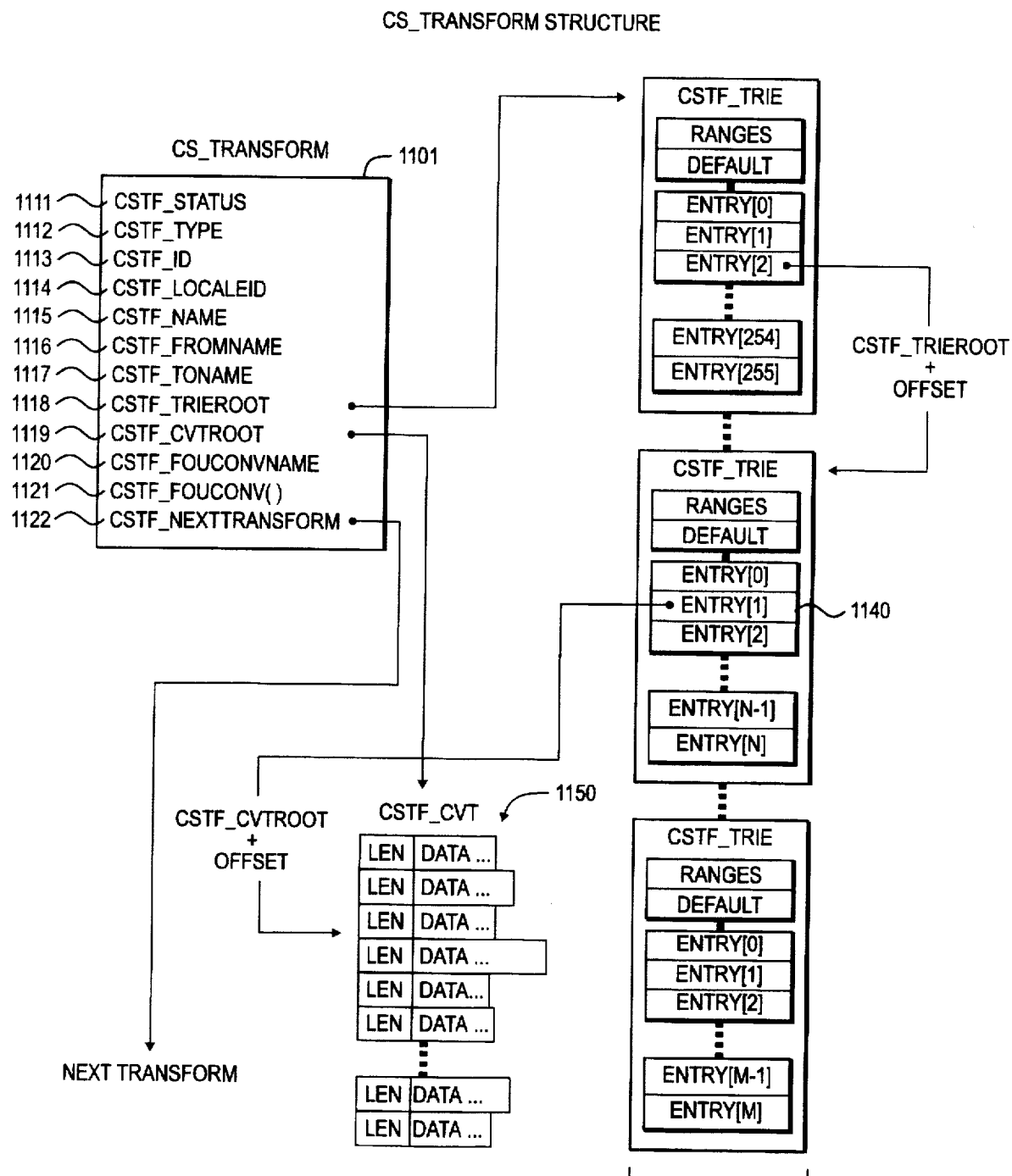
FIG. 11 illustrates diagramatically the detailed layout of a transform structure.

FIG. 11 diagramatically illustrates the detailed layout of a transform structure 1101. Here, each member of the structure includes the prefix "cstf" —"character set transformation." The entries function as follows. Status field 1111, cstf_status, stores status information for the transformation. The status flag 1111 stores an enumerated value. In an exemplary embodiment, the value is one of the following:

| CSTFSTAT_8BIT: | -1-to-1, 8-bit base, trie defaults to 256 byte array holding 8-bit characters in byte[0] of each entry. |
|---|---|
| CSTFSTAT_256ROOT: | 256 byte master trie, with indirection through a second level of tries. |
| CSTFSTAT_VARROOT: | Variable length master trie, with pointers to more tries. |
| CSTFSTAT_CVTROOT: | cvtRoot is used to get variable length results. |
| CSTFSTAT_FNONLY: | User supplied function only, no tables (e.g., UTF8-to-USC-2). |

The first status flag, CSTFSTAT_8BIT, indicates an 8-bit transform from one character to one character, where the character itself indexes into a single 256-byte array holding 8-bit quantities. CSTFSTAT_256ROOT indicates that the first trie (master trie) has 256 entries, where the first byte of a character quantity is used to index into the master trie and indirection through a second level of tries, depending on the value in each trie. CSTFSTAT_VARROOT indicates a variable-length root. In other words, the master trie can have any length, with additional pointers to more tries (or indefimiscellaneous transform tables. Note that these correlate to previously-described entries in the CHAR_ATTRIB structure. Types 1003 and 3003, for instance, can be employed for ChartoUCS2 and UCS2toChar entries. Type 4003 can be used for case and quotes mapping entries. Type 6003 can be used for the transNext entry, which points to transformation structures which follow (for any number of generic transformation values).

The ID field 1113, cstf_id, stores a unique ID for the transformation. The transform ID is a 2-byte quantity which is composed of IDs for the transformation and the character set. Locale ID field 1114, cstf_localeID, stores the locale ID associated with this transform. Locale ID is an implementation-defined numeric value used for indicating a locale currently being employed.

Name field 1115, cstf_name, stores the name for the transform. From name field 1116 and to name field 1117, cstf_fromname and cstf_toname, respectively, are employed for storing names of a from/to conversion. The from name and to name are typically used for diagnostic and status messages. Examples include a name for the source character set and one for the destination character set. Trie root field 1118, cstf_trieRoot, stores a pointer to the root structure of tries employed for performing transformations. This is followed by conversion root field 1119, cstf_cvtRoot, which stores a pointer to a conversion heap. As previously described, the conversion heap is employed for target pieces of data of varying size which are not stored within the tries.

The next two elements in the transform structure are optional. Form of use conversion name field 1120, cstf_fouConvName, is employed for conversions by name, based on an algorithm. If using a table structure is not applicable, for instance, this field allows the system to call by name to a configurable conversion function. This is followed by form of use conversion (function) pointer field 1121, cstf_fouConvo( ), which stores a pointer to a conversion function. The final data member, next transform pointer 1122, cstf_nextTransform, stores a pointer to the next transform structure or record, in a chain of transform records.

The trie root 1118 points to a linked list 1130 of tries (i.e., structures of type cstf_trie). As previously described, the trie structures are sparsely populated structures which give an indication to the transformation process—that is, "how to" do the transformation process itself. In other words, it provides information about how a character entity is transformed into some other entity, which is not necessarily a character.

In an exemplary embodiment, a trie structure itself may be constructed as follows.

```
typedef structcstf_trie
{
    BYTE validStart;    /* Start of Valid data                               */
    BYTE validEnd;      /* Last valid data                                   */
    BYTE dataStart;     /* Start of specific data                            */
    BYTE dataEnd;       /* Last of specific data                             */
    int32 default;      /* Default values for data between validStart
                           and dataStart, and between dataEnd and
                           validEnd   */
    int32 entry[256];   /* Data between dataStart and dataEnd                */
} CSTF_TRIE;
```

As shown, each trie record or structure comprises an 8-byte quantity. Accordingly, the tries exist as a virtual structure of 8-byte quantities.

The first two members of the record are employed for indicating a valid range, as previously described. Specifically, the first two members indicate the range of valid data. For UTF8, for instance, there exists a range for legal characters; any character outside that range is considered illegal. The next two members, dataStart and dataEnd, indicate the start and end of specific data, respectively. If the trie entry being indexed into does not fall within this range, the default value (i.e., "default" member) is employed instead.

Once the system has determined that it has a valid character within the specific data range, it subtracts the dataStart value from the character and uses the result to index into the entry array. For instance, an example pseudocode fragment to get an entry would appear as follows (where *cp is the character pointer for our search item).

```
if (*cp < cstf_trie->validStart
    | | *cp > cstf_trie->validEnd)
    then process illegal character
else
    entry   =   (*cp<cstf_trie->dataStart | |
                *cp > cstf_trie->dataEnd)
                ? cstf_trie->default
                : cstf_trie->entry[*cp-dataStart];
```

In this manner, the proper trie entry may be determined.

Each trie entry itself comprises a single-byte header followed by a 3-byte entry. Based on the single-byte header (i.e., the previously-described status flags), the system can determine whether the final value has been located, or whether the entry in the trie field is actually a pointer to another trie array. In the latter case, the next byte in the character stream is employed as an index into the next trie. In the event of a final value, the entry may in fact be a pointer into the conversion heap (for indefinite-length data). At a particular entry point, therefore, the system may have to go "farther" for completing the transformation. On the other hand, the system may have found a final value based on the first byte alone of a multi-byte character, such as previously described for Asian ideographic characters.

4. Construction of conversion heap

Indexing into the first trie structure might require indexing into yet another trie structure (e.g., using the second byte of the character being processed). As shown at 1140, an entry in the second trie may yield an entry pointing to the conversion heap, shown at 1150. The conversion heap itself comprises an array of variable length data. In an exemplary embodiment, a convert structure or record may be constructed as follows (using the C programming language).

```
typedef struct cstf_cvt
{
    BYTE cvtlen
    BYTE cvtdata[255]
} CSTF_CVT;
```

Example entries for the conversion heap are as follows.

```
Upper case German <ess-zet>, 'β' -> "SS" in Unicode
    cvtlen  |---S---| |---S---| padding
    [0x04][0x00][0x53][0x00][0x53][0][0][0]
Lowercase Turkish dotless T -> 'I' in Unicode
    cvtlen  |---1---| padding
    [0x02][0x01][0x31][0]
Zenkaku Katakana Japanese "GA" to hankaku katakana "KA" + "voice-mark"
    [0x04][0XFF][0x67][0XFF][0X9E][0][0][0]
Unicode Chinese U+4E5C to EUC-CNS 0x8EA2A1A2
    [0x04][0X8E][0XA2][0xA1][0xA2][0][0][0]
```

For performance reasons (e.g., data alignment), each entry is padded to lie on a 4-byte boundary. In essence, the conversion heap is employed as an exception mechanism, in order to keep the conversion data structures at a minimum size. Note particularly that if variable length entries were employed in the trie structures themselves, one would not be able to index directly into a trie; as a result, performance would likely suffer. By breaking these out separately, the system maintains performance and flexibility.

B. Soundex transformation data structures

One problem which exists with using Soundex is alphabets exist where each unique graphical element has an associated phonetic element, but they are not representable in the Roman alphabet. Another problem, within the Roman alphabet itself, is the use of accents and diacritic marks. For instance, "aardvark" spelled as "ardvark" yields a completely different Soundex value than the "aardvark" spelling.

The previously-described transforms neatly fit into a pattern of traversing trie structures, with exception handling into a conversion heap. In addition to the foregoing transformations, the system of the present invention also provides transform which determines a Soundex value for any alpha character. According to the present invention, characters are normalized to fit within the A through Z range, with locale-specific associations.

In an exemplary embodiment, the Soundex transform structure may be constructed as follows.

```
typedef struct cs_tosound
{
    short    csnd_status;    /* Status flags                               */
    short    csnd_type;      /* Type of soundex map                        */
    short    csnd_id;        /* Sound Map ID                               */
    short    csnd_localeID;  /* ID for locale, zero is default             */
    short    csnd_namelen;   /* Length of the name                         */
    BYTE     csnd_name[MAXNAME]; /* Name of character set                  */
    unichar  csnd_map[26];   /* Soundex values for A-Z                     */
    CSTF_TRIE *    csnd_trieRoot;  /* Root trie structure                  */
    long     csnd_lastTrie;  /* index to last Trie structure               */
    CSTF_CVT*    csnd_cvtRoot;  /* Root of transform heap                  */
    long     csnd_lastCvt;   /* index to last CSTF_CVT element             */
    CS_TOSOUND *csnd_nextToSound; / *Pointer to next transform struct.     */
} CS_TOSOUND;
```

Figure 12:
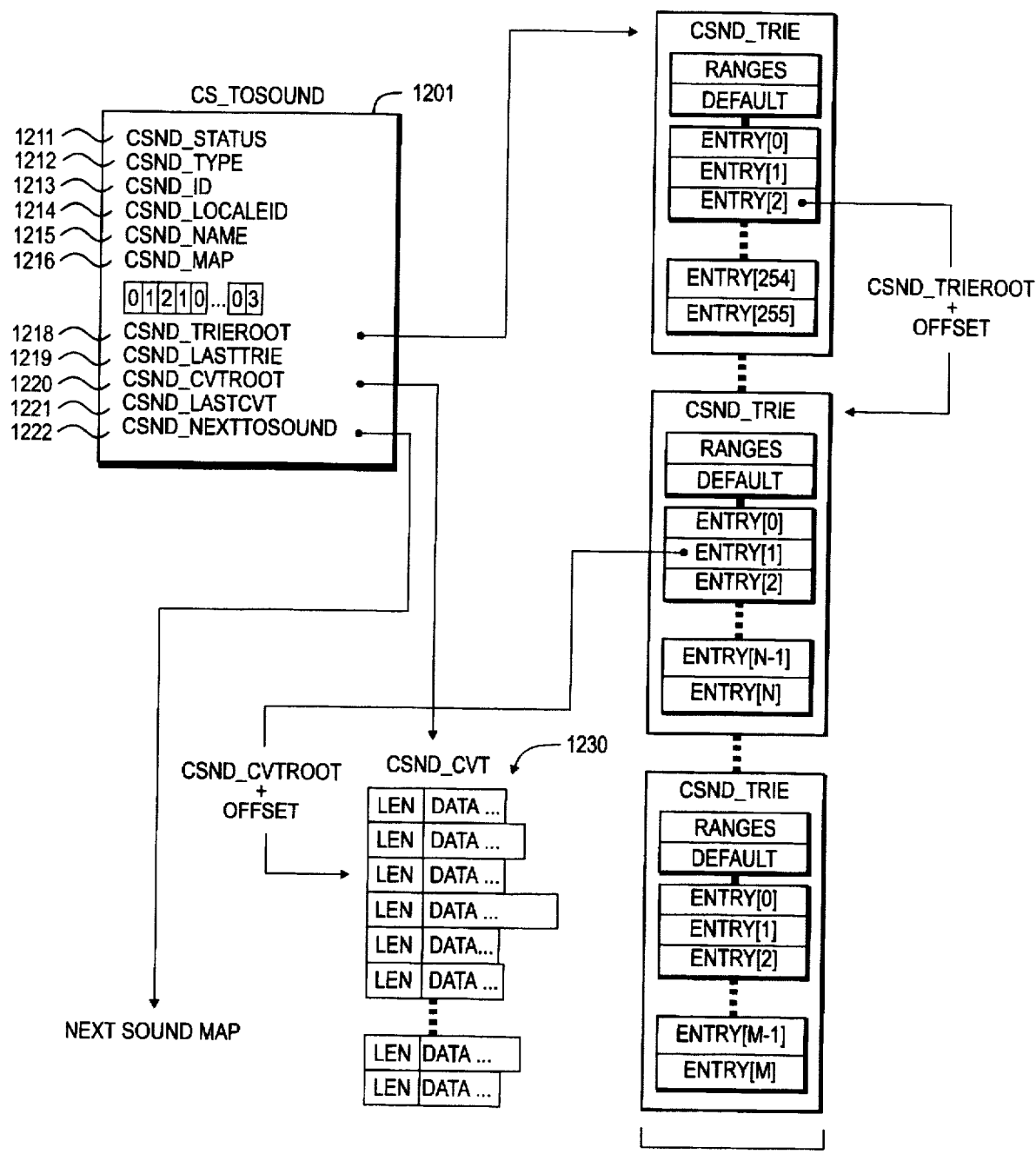
FIG. 12 illustrates diagramatically the detailed layout of a Soundex "to-sound" structure.

FIG. 12 illustrates a Soundex transform structure 1201, cs_tosound, for providing Soundex support in a generalized, localizable manner. The structure includes a Soundex map 1216, csnd_map, comprising a 26-byte array, where each entry in the array stores a numeric quantity between 0 and 9. The system takes the alphabetic character (regardless of what script it is in), based on context and locale ID, and traverses a linked list of trie structures 1220 (i.e., Soundex trie structures), for transform processing similar to that previously described. If need be, the system will drop into a conversion heap, shown at 1230. At the conclusion of the transform operation for Soundex, the system will have determined a single letter between A through Z, or a sequence of letters each of which is between A through Z. This yields an acceptable phonetic value which then can be used to map back to the standard Soundex algorithm.

The status field 1211, csnd_status, indicates whether the transform entails a straight character to sound (i.e., no string expansion). Valid status flags, based on an enumerated value, are as follows.

| CSNDSTAT_BASIC: | Straight character to sound. No string expansion. |
|---|---|
| CSNDSTAT_STRINGS: | Character to string mapping (some characters, such as Japanese kana or Korean hangul, map to Roman phonetic multi-character strings). |

The type field 1212, csnd_type, stores a value indicating valid type. In the currently preferred embodiment, a single type is stored: 5003—class 3 Soundex table. The ID field 1213, csnd_id, type stores a Soundex ID together with a character set ID. The character set employed in a preferred embodiment is Unicode. However, the Soundex support can be implemented for other character sets, as desired. The locale ID field 1214, csnd_localeid, indicates the default locale. The name field 1215, csnd_name, stores name which is used for diagnostic and status messages; it also uniquely identifies the sound map. The sound map field 1216, csnd_map, itself holds a small array of 26 Unicode characters which represent integer values from 0 to 9, from which a Soundex numerical component is derived.

The remaining Soundex fields function in a manner similar to that previously described. Trie root 1218, csnd_trieRoot, is a physical pointer to a linked list of trie structures, from which indirect addressing to transform entities takes place. Each index to another trie is indexed from this route. The last trie is indicated by csnd_lasttrie 1219. Conversion root 1220, csnd_cvtRoot, stores a pointer to the root of a conversion heap for Soundex; it stores variable length conversion strings. The csnd_cvtroot member stores a pointer to the last one of the conversion entries. The Soundex structure includes no support for calling out to an algorithmic Soundex function, unlike the cstf_structure. A callback function can be added if desired, however. The "next to-sound" field 1222, csnd_nextToSound, stores a pointer to the next Soundex transform structure in a linked list of such structures. This provides extensibility to other locales in a manner as previously described.

Figure 13:
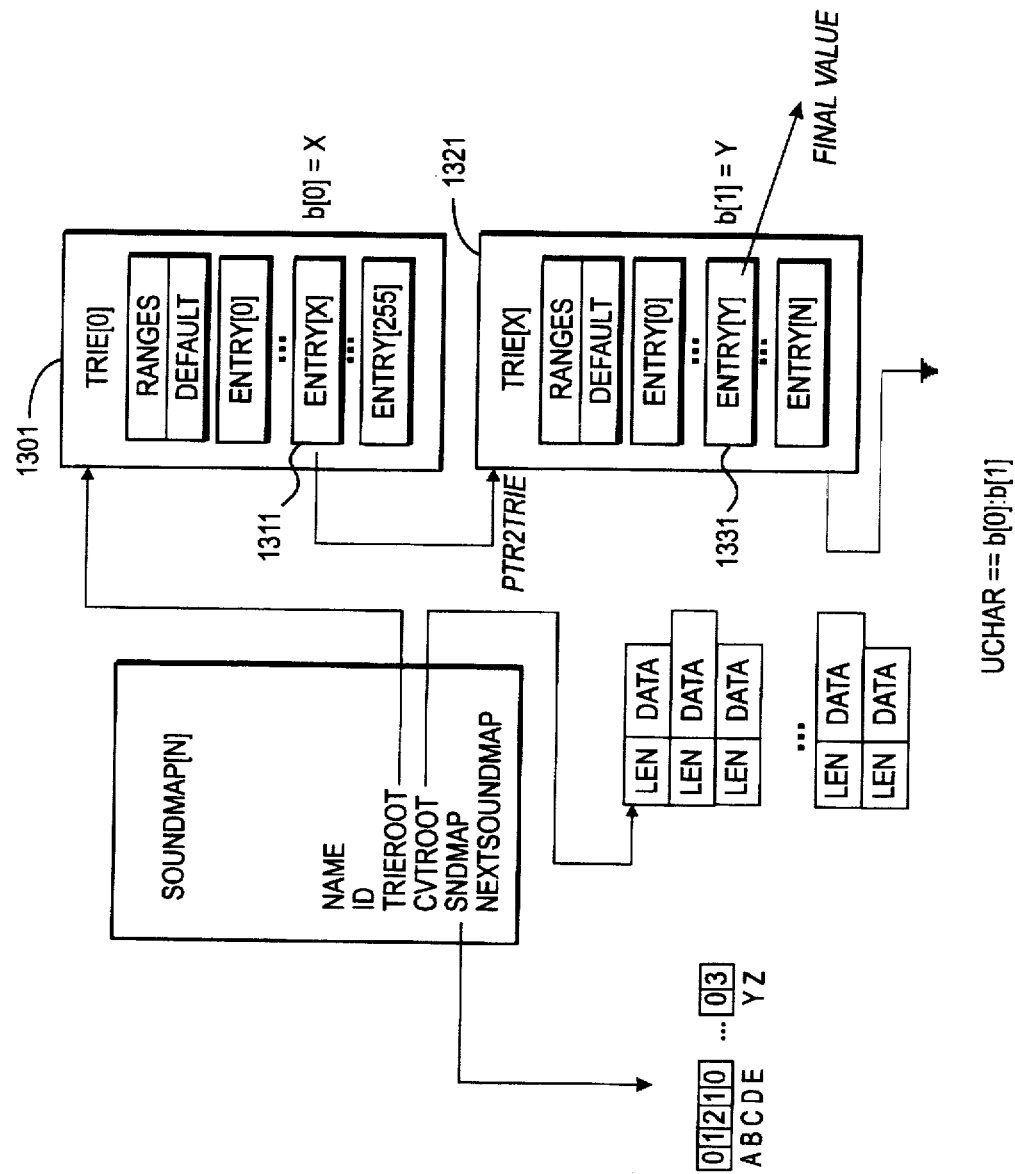
FIG. 13 is a block diagram illustrating a Soundex transformation performed in accordance with the present invention.

FIG. 13 illustrates a Soundex transformation in accordance with the present invention. Given a Unicode value (i.e., character) and a root trie 1301, the system first indexes through the most significant byte of the character; here, this is indicated to be the value of x. Before performing the actual indexing, the system checks whether x is within the range: greater than the start of the range and less than the end of the range. If it is within the range, the start of the range is subtracted from x. The resultant is employed to index into the array of entries, for resolving a particular entry. For this example, the entry is entry[x], shown at 1311.

At entry x, the system examines the flag stored thereat. If the flag stores a negative value (i.e., high bit set to "high"), then a pointer is stored by the entry (i.e., the remaining 3 bytes). These bytes can be masked off using bitwise operations for extracting the pointer. The 3-byte pointer is expanded out to a 4-byte quantity (integer) to point to another trie. The system at this point "drops into" that next trie—trie[x], shown at 1321. Now, the system takes the second byte of the 2-byte Unicode value (i.e.,b[1]), checks the ranges, and indexes into the corresponding entry—entry [y], shown at 1331. For this example, the status mask stored thereat is non-negative, thereby indicating a final value. From the status mask, the system determines the particular bytes to extract out of the trie entry, for reaching the final value.

Further description of the present invention may be found in originally-filed Appendix A, now canceled for convenience of patent publication: McKenna, Michael G., *Using*

*Locales with Unicode-based Data Structures*, The Unicode Consortium, Seventh International Unicode Conference, San Jose, Calif., Sep. 14–15, 1995, the disclosure of which is hereby incorporated by reference. Still further description of the present invention may be found in originally-filed Appendix B, now canceled for convenience of patent publication: McKenna, Michael G., *Unicode for SCG Products Design Specs*, Sybase, Inc. of Emeryville, Calif., 1995, the disclosure of which is hereby incorporated by reference.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computer system, a method for transforming textual information based on locale-specific information, the method comprising:

providing a transformation structure comprising a plurality of arrays storing locale-specific information for a particular type of character transformation;

receiving input requesting that the character transformation be performed on an input character, said input character comprising at least one byte value;

mapping said input character into a Unicode character using a Unicode mapping table, said Unicode character comprising a plurality of byte values; and transforming said Unicode character into a final transformation value for said input character, by performing the substeps of:
   (i) using a most significant byte of said Unicode character to reference a particular entry of a particular one of said plurality of arrays,
   (ii) determining whether the entry being referenced stores said final transformation value or a reference to a another one of said plurality of arrays,
   (iii) if said entry stores said final transformation value, satisfying said request by returning said final transformation value stored at the entry being referenced and thereafter terminating the method,
   (iv) if said entry stores a reference to another one of said plurality of arrays, using a next most significant byte of said Unicode character to reference a particular entry of said another one of said plurality of arrays, and
   (v) repeating substeps (ii)–(iv) until said final transformation value is located.

2. The method of claim 1, wherein said Unicode character comprises a 16-bit character.

3. The method of claim 1, wherein said character transformation comprises a case mapping operation.

4. The method of claim 1, wherein said character transformation comprises a lexical attribute determination operation.

5. The method of claim 1, wherein said character transformation comprises a code set conversion.

6. The method of claim 1, wherein said character transformation comprises an operation for determining character metrics.

7. The method of claim 1, further comprising:

returning a default transformation value as said final transformation value in the event that the method be unable to locate said final transformation value within said plurality of arrays.

8. The method of claim 1, further comprising:

returning a default transformation value as said final transformation value in the event that said input character is invalid.

9. The method of claim 1, further comprising:

providing a conversion heap for storing an entry having a final transformation value which is too large to be stored in said plurality of arrays, wherein at least one entry includes a reference to said entry of said conversion heap.

10. The method of claim 1, further comprising:

providing a callback function for computing a final transformation value based on said input character.

* * * * *